US005562490A

United States Patent [19]
Rybolt et al.

[11] Patent Number: 5,562,490
[45] Date of Patent: Oct. 8, 1996

[54] HIGH AMPACITY ELECTRICAL QUICK DISCONNECT

[75] Inventors: Arnold C. Rybolt, Anderson, Ind.; Rebecca J. Holliday, Edwardsburg; Gregory S. Smith, Wixom, both of Mich.

[73] Assignee: General Motors Corporation, Detroit, Mich.

[21] Appl. No.: 335,239

[22] Filed: Nov. 7, 1994

Related U.S. Application Data

[63] Continuation-in-part of Ser. No. 173,025, Dec. 27, 1993, abandoned.

[51] Int. Cl.⁶ .................................................. H01R 13/187
[52] U.S. Cl. ........................................ 439/507; 439/332
[58] Field of Search ................................. 439/507, 332, 439/333, 334, 489, 490, 188

[56] References Cited

U.S. PATENT DOCUMENTS

| | | | |
|---|---|---|---|
| 1,819,302 | 8/1931 | Rah | 439/507 |
| 3,107,966 | 10/1963 | Boubomme | 339/241 |
| 3,288,958 | 11/1966 | Walther et al. | 439/507 |
| 4,750,897 | 6/1988 | Neidecker | 439/825 |

FOREIGN PATENT DOCUMENTS

| | | |
|---|---|---|
| 13608276 | of 0000 | Germany . |
| 13629040 | 12/1987 | Germany . |
| 13734682 | 11/1988 | Germany . |

OTHER PUBLICATIONS

Soviet Inventions Illustrated, R section, week 7915, 1979, May 23, Derwent Publications Ltd., London; SU-A-609 138 (BRON).
"RADSOK" Product Brochure—Date Unknown.
Joe Koch, "Hyperbolic Connector Terminal Design for High Amperage Applications"—Date Unknown.

*Primary Examiner*—Daniel W. Howell
*Attorney, Agent, or Firm*—Lawrence B. Plant

[57] ABSTRACT

A compact high voltage, high ampacity quick disconnect for alternately connecting and disconnecting an electrical power supply from a load. The disconnect includes two spaced apart terminals having axially aligned openings and embedded in a nonconductive housing. A conductive pin engages the openings to electrically couple the connectors. The pin has a handle in one end thereof for locking or moving the pin as needed. An elastomeric seal between the handle and the housing protects the quick disconnect from contamination.

15 Claims, 2 Drawing Sheets

HIGH AMPACITY ELECTRICAL QUICK DISCONNECT

This invention relates to a compact electrical, quick disconnect for high voltage, high amperage electrical systems such as are employed in electric vehicles, and is a continuation-in-part application of U.S. patent application Ser. No. 08/173,025 (now abandoned) filed 27 Dec. 1993 in the names of Arnold C. Rybolt and Rebecca J. Holliday, and is assigned to the assignee of the present application.

BACKGROUND OF THE INVENTION

It is known to have electrical disconnects between high amperage, high voltage power supplies and the electrical loads they serve. It is particularly desirable to have a compact such device in an electric vehicle to isolate the battery from the electric drive and control systems particularly during maintenance of such systems or the battery. Disconnects used heretofore for high amperage, high voltage systems have typically utilized bulky manual switches housed in locked boxes. Such switches and the housings therefor are undesirable in applications, such as electric vehicles, where volume, weight and operating environment are important considerations. Any electrical disconnect in an electric vehicle must not only have low mass and low volume, but must be simple to operate, essentially foolproof and capable of operating in an automotive environment which is subject to vibrations, corrosion and wide temperature variations.

It is an object of the present invention to provide a compact (i.e., low volume/mass) high voltage, high ampacity, simple to use, foolproof quick disconnect which is capable of operating in an automotive environment. This and other objects and advantages of the present invention will become more readily apparent from the detailed description thereof which follows.

This invention comprehends a compact high voltage, high ampacity quick disconnect for alternately manually connecting and disconnecting an electrical power supply to/from an electrical load. The invention is particularly useful in electric vehicles, but may also be used in other applications. The quick disconnect includes an input terminal receiving electrical current from the supply, and an outlet terminal receiving electrical current from the input terminal for delivering it to the load. The terminals are spaced apart from each other and each comprises an electrically conductive sleeve embedded in an insulating material and defining opening adapted to snugly receive a common electrical conductor which serves to electrically couple the terminals to each other. The terminals are held juxtaposed, albeit spaced apart, in an insulating housing such that the axes of their respective openings are aligned one with the other. A conductor whose external shape substantially conforms to the shape of the openings is movable in the direction of the axes of the openings for engaging and disengaging the sleeves to effect such electrical coupling and uncoupling. A nonconductive handle engages one end of the conductor for moving the conductor into and out of engagement with the sleeves. The conductor will preferably be a cylindrical copper rod having a diameter smaller than the IEC's standard finger.

The sleeves, which are electrically connected to input and output cables, preferably comprise a bundle of parallel wires joined together at their ends and capable of expanding radially to snugly engage a conductor inserted therein. The wire bundle will preferably be necked down at a location mid-way between the ends of the wires such that the sleeve has a generally hyperbolic or hour-glass shape. The necked down portion of the sleeve is smaller than the outside diameter of the conductor but is readily expansible when the conductor is inserted therein. Once expanded the sleeve will constrictively engage the outer surface of the conductor over substantially the entire length of the sleeve hence resulting in a low resistance electrical connection therebetween. Preferably, the wires comprising the sleeves are skewed with respect to the central axis of the sleeve with which they are associated such that the sleeve has a helical configuration. Most preferably, the wires are flat so that a large surface area thereof will engage the conductor for maximum low resistance conductivity through the switch. Such helical, hyperbolic connectors are per se known in the art, but have not heretofore been used in the manner described herein.

The handle comprises a fingergrip portion and a flange portion overlying a substantial portion of the housing embedding the terminals. A collar depends from the flange circumscribes one end of the conductor and mates with a well in the housing. At least one dog projects from the collar for engaging an undercut shelf in the housing adjacent the well upon insertion of the conductor into the sleeve and rotation of the handle so as to lock the conductor in position and prevent extraction thereof from the housing. The collar engages an auxiliary switch positioned in the housing for signaling or initiating other electrical disconnects, when the conductor is engaged or disengaged and hence the connectors coupled or uncoupled.

The quick disconnect will preferably include an elastomeric seal sandwiched between the flange on the handle and the upper surface of the housing to prevent incursion of contaminants (e.g., dirt, moisture, etc.) into the housing and the terminals embedded therein. Most preferably, the perimeter of the seal will extend beyond the periphery of the housing and engage the structure surrounding the housing for still further protection of the disconnect from contamination.

DETAILED DESCRIPTION OF A SPECIFIC EMBODIMENT OF THE INVENTION

The present invention will be more readily understood when considered in the light of the following discussion of a certain specific example thereof which is given hereafter in conjunction with the several figures in which.

Figure 1:
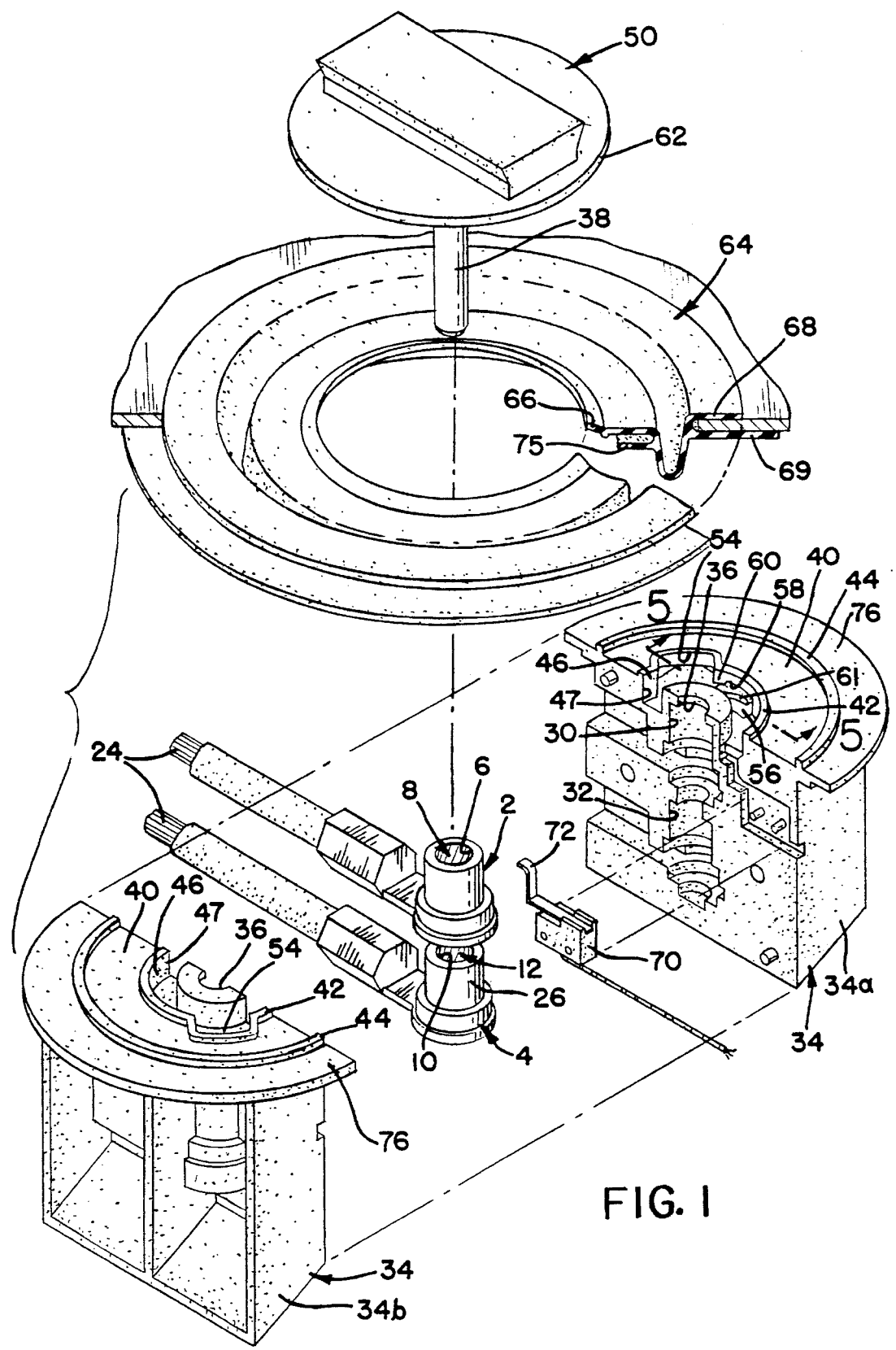
FIG. 1 is an exploded, isometric view of the quick disconnect of the present invention.
Figure 2:
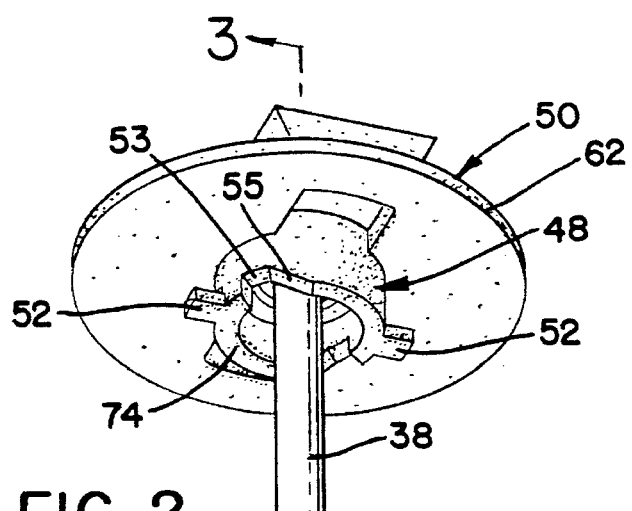
FIG. 2 is an isometric view of the underside of the handle and conductor assembly in accordance with the present invention.
Figure 5:
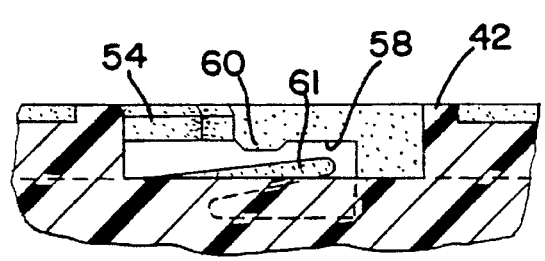
FIG. 5 is a view taken in the direction 5—5 of FIG. 1.
Figure 3:
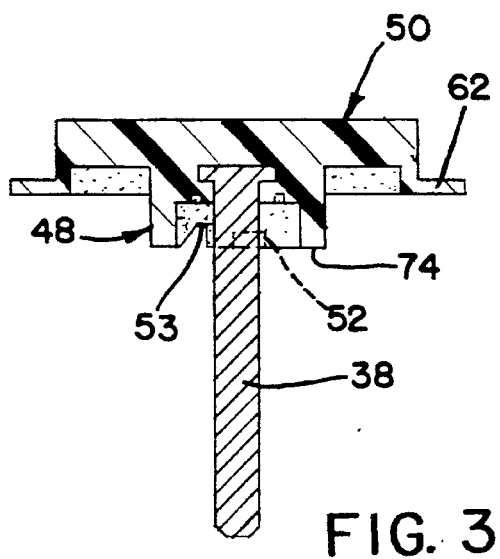
FIG. 3 is a sectioned view in the direction 3–3 of FIG. 2.
Figure 4:
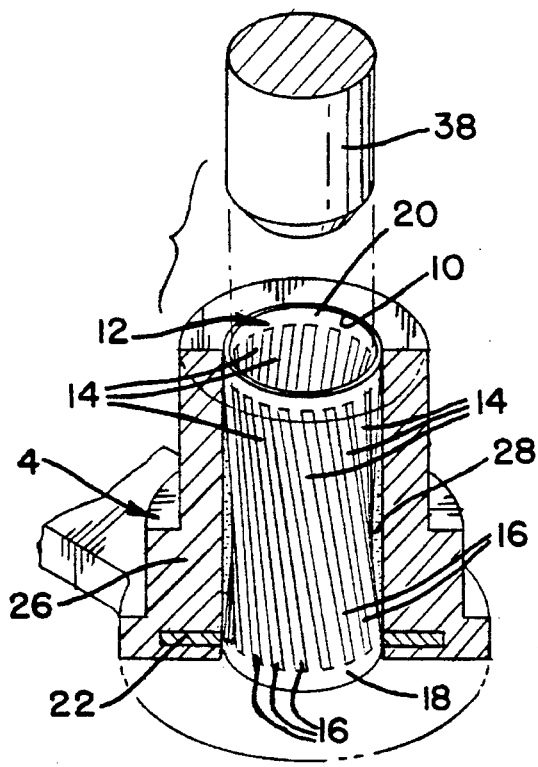
FIG. 4 is a partially sectioned, isometric view of a helical, hyperbolic terminal sleeve used in the present invention.

The several Figures depict a compact, high ampacity (e.g., ca. 400 amps continuous at 25° C.), high voltage (e.g., ca. 500 volts) quick disconnect including spaced apart first terminal 2 and second terminal 4. The disconnect is capable of handling ultra high amperage excursions of about 2500 amps for 50–100 millisecs which is long enough for any fuses in the power circuit to blow. The terminal 2 has an opening 6 therein defined by a sleeve 8. The terminal 4 has a similar opening 10 defined by a similar sleeve 12. The openings 6 and 10 are axially aligned. The sleeves 8 and 12 preferably comprise a plurality of wires 14 separated by slots 16 which are joined together at their ends 18 and 20 as best shown in FIG. 4. The end 18 is connected to a blade-like connector 22 which in turn is connected to the cable 24. An conducting cover 26 surrounds the sleeve 12 as best shown in FIG. 4. The several wires 14 will preferably by skewed relative to the center axis of the opening 10 so as to provide a helical sleeve 12. This is conveniently accomplished by twisting the sleeve 12 which also causes the center of the sleeve 12 to become necked down at the reduced diameter zone 28 and the sleeve 12 takes on a hyperbolic or hourglass shape. Terminals of this general type are known in the electrical connectors as hyperbolic or helical terminals. A preferred such terminal for this application is commercially available from the RADSOC Company.

The terminals 2 and 4 fit into conforming pockets 30 and 32 molded into a housing 34 made of electrically insulating material. The housing 34 is formed in two parts, 34a and 34b, which join together along the center line of the terminals 2,4 to embed the terminals 2,4 completely therein. Appropriate fasteners (not shown) are provided to hold the housing halves 34a and 34b together. The housing 34 includes an opening 36 which is in axial alignment with the axes of the openings 6 and 10 in the terminals 2 and 4 and is sized to closely receive the conductor rod 38. The housing 34 includes a surface 40 having substantially concentric lands 42 and 44 thereon circumscribing the opening 36. The land 42 defines the mouth of a well 46 defined by an annular wall 47 and adapted to receive a collar 48 on a handle 50 attached to the end of the conductor 38. The collar 48 includes locking dogs 52 projecting radially therefrom which engage slots 54 in the wall 47. The bottom of the slot 54 opens to an undercut region 56 lying beneath a shelf 58 such that upon clockwise rotation of the handle 50 the dogs 52 rotate under the shelf 58 and engage detents or stops 60 in the underside of the shelf 58 to lock the handle 50 in place in the housing 34. By preventing unwanted counter rotation thereof, a finger-like spring 61 is molded into the housing 34 and serves to bias the dogs 52 upwardly in the locked position behind the detent/stop 60. To unlock the handle 50, downward pressure is applied thereto to depress the spring 61 sufficiently to permit the dogs 52 to move beneath the detent/stop 60 when the handle is rotated counterclockwise.

The handle 50 includes a flange portion 62 which overlies the lands 42 and 44 on the housing 34. An elastomeric seal 64 positioned between the handle flange 62 and the housing 34 is compressed between the flange 62 and lands 42 and 44 to provide a secure seal around the well 46. An upstanding lip 66 on the seal 64 engages the underside of the flange 62 to provide an additional seal. An upper flange 68 and lower flange 69 on the periphery of the seal 64 extend radially outboard the perimeter of the housing 34 and engage therebetween a body member of the vehicle which forms the mouth of a pocket (not shown) or the like in the vehicle in which the quick disconnect is located for further protection from the elements. A lower inner flange 75 on the seal 64 fits under the rim 76 of the housing 34 to hold the seal 64 captive during the installation of the quick disconnect assembly to or in a vehicle.

The conductor 38 comprises a highly conductive metal such as copper or alloys thereof and will preferably have a diameter of 10 mm or less. While the conductor 38 is preferably a cylindrical rod, other shapes may also be used. A cylindrical rod is preferred because it permits ready rotation of the rod and handle during locking and unlocking and provides a continuous high surface area contact with the sleeves of the respective terminals 2 and 4.

A switch 70 is mounted in the housing 34 such that its contact arm 72 engages the lower rim 74 of the collar 48 when the conductor 38 is locked into place and serves (1) to signal whether or not the disconnect is engaged or disengaged (and accordingly whether or not the power is connected or disconnected from the load), and/or (2) initiate other electrical disconnects (e.g., relays) which serve to further isolate the battery from the vehicle's electrical systems when the disconnect is not locked in place. Upon insertion of the collar 48 into the well 46, the contact arm 72 is aligned with the cutout 53. Rotation of the handle 50 into the locking position causes the caming surface 55 to depress the contact arm 72 and close the switch 70.

While the invention has been described primarily in terms of certain specific embodiments thereof, it is not intended to be limited thereto but rather only to the extent set forth hereafter in the claims which follow.

The embodiments of the invention in which an exclusive property or privilege is claimed as defined as follows:

1. A compact, high voltage, high ampacity, quick disconnect for alternately connecting and disconnecting an electrical power supply to/from an electrical load comprising:
    an input terminal receiving electrical current from said supply, said terminal having a first electrically conductive sleeve defining a first opening adapted to snugly receive an electrical conductor, said opening having a first axis;
    an outlet terminal receiving electrical current from said input terminal for delivering said current to said load, said outlet terminal having a second electrically conductive sleeve defining a second opening adapted to snugly receive an electrical conductor, said opening having a second axis;
    an insulated housing embedding said terminals and holding them juxtaposed but apart from each other such that said first and second axes are aligned one with the other;
    a conductor conforming substantially to said openings and moveable in the direction of said axes for engaging and disengaging said sleeves so as to electrically couple and uncouple said sleeves to each other; and
    a nonconductive handle engaging said conductor for moving said conductor into and out of engagement with said sleeves.

2. A disconnect according to claim 1 wherein said conductor is substantially cylindrical.

3. A disconnect according to claim 2 wherein said sleeves comprise a bundle of parallel wires joined together at both ends thereof.

4. A disconnect according to claim 3 wherein said bundle is necked down between said ends such that said sleeve has a generally hyperbolic shape.

5. A disconnect according to claim 3 wherein said wires are skewed with respect to the axis of their associated sleeve such that said sleeve has a helical configuration.

6. A disconnect according to claim 5 wherein said wires are flat.

7. A disconnect according to claim 3 wherein said sleeve expands upon insertion of said conductor and constrictively engages said conductor.

8. A disconnect according to claim 1 wherein said handle includes at least one dog engaging an undercut shelf in said housing upon insertion of said conductor into said sleeves and rotation of said handle to lock said conductor in position.

9. A disconnect according to claim 1 wherein said housing comprises a molding formed of at least two parts secured together at a parting line dissecting said terminals.

10. A disconnect according to claim 1 wherein said conductor comprises a copper rod.

11. A disconnect according to claim 1 wherein said handle comprises a collar engaging said conductor.

12. A disconnect according to claim 11 wherein said collar includes at least one dog engaging an undercut shelf in said housing upon insertion of said conductor into said sleeves and rotation of said handle to lock said conductor in position.

13. A disconnect according to claim 6 wherein said housing includes a detent depending from said shelf for preventing counter rotation of said handle, and a spring underlying said shelf, said spring serving to bias said dog into engagement with said shelf when said dog has been rotated passed said detent to thereby prevent unwanted counter rotation of said handle.

14. A disconnect according to claim 13 wherein said spring has a finger-like configuration and is molded integrally with said housing.

15. A compact, high voltage, high ampacity, quick disconnect for alternately connecting and disconnecting an electrical power supply to/from an electrical load comprising:

an input terminal receiving electrical current from said source, said terminal having a first electrically conductive sleeve defining a first opening adapted to snugly receive an electrical conductor, said opening having a first axis;

an outlet terminal receiving electrical current from said input terminal for supplying said current to said load, said outlet terminal having a second electrically conductive sleeve defining a second opening adapted to snugly receive an electrical conductor, said opening having a second axis;

a insulated housing embedding said terminals and holding them juxtaposed but apart from each other such that said first and second axes are aligned one with the other;

a conductor conforming substantially to said openings and moveable in the direction of said axes for engaging and disengaging said sleeves so as to electrically couple and uncouple said sleeves to each other;

a nonconductive handle engaging said conductor for moving said conductor into and out of engagement with said sleeves;

an elastomeric seal interjacent said handle and said housing to keep contaminants from entering said housing; and a switch in said housing engaging said handle for indicating the position of said handle in said housing.

* * * * *